US012705243B2

(12) United States Patent
Behera et al.

(10) Patent No.: US 12,705,243 B2
(45) Date of Patent: Aug. 11, 2026

(54) PLAN CACHE HYDRATION FOR DATABASE SYSTEMS

(71) Applicant: MICROSOFT TECHNOLOGY LICENSING, LLC, Redmond, WA (US)

(72) Inventors: Smita Behera, Yarrow Point, WA (US); In-Jerng Choe, Sammamish, WA (US); Manish Eknath Tawade, Redmond, WA (US); Johnathan Chow, Redmond, WA (US); Charles Edward Hennessey, Redmond, WA (US); Wai Keat Tan, Seattle, WA (US); Patryk Maciej Uchman, Seattle, WA (US); Derek Marcel Wilson, Chester, VA (US); Adrian Dragusanu, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/991,203

(22) Filed: Dec. 20, 2024

(65) Prior Publication Data

US 2026/0178587 A1 Jun. 25, 2026

(51) Int. Cl.

| | |
|---|---|
| ***G06F 16/2455*** | (2019.01) |
| ***G06F 16/2453*** | (2019.01) |
| ***G06F 16/27*** | (2019.01) |

(52) U.S. Cl.

CPC .. *G06F 16/24552* (2019.01); *G06F 16/24542* (2019.01); *G06F 16/275* (2019.01)

(58) Field of Classification Search

None

See application file for complete search history.

(56) References Cited

U.S. PATENT DOCUMENTS 6,938,036 B2 * 8/2005 Dettinger .......... G06F 16/90335 707/E17.14
8,572,031 B2 * 10/2013 Merriman .......... G06F 11/0709 707/613

(Continued)

FOREIGN PATENT DOCUMENTS

CN 102937955 A 2/2013

OTHER PUBLICATIONS

Satonaoki, "High Availability in Azure SQL MI: General Purpose service tier", Retrieved From: https://azureaggregator.wordpress.com/2022/04/30/high-availability-in-azure-sql-mi-general-purpose-service-tier-2/, Apr. 30, 2022, 7 pages.

(Continued)

*Primary Examiner* — Debbie M Le

(74) *Attorney, Agent, or Firm* — Han Gim; Newport IP, LLC

(57) ABSTRACT

A computing network provides a database service and implements a caching mechanism for processing database queries. The database services are provided using a primary replica of data and computing resources, and a secondary replica of the data and computing resources. The primary and secondary replicas are synchronized so that the secondary replica can provide the database services in place of the primary replica in response to a failover from the primary replica to the secondary replica. In response to initiating, by the database service, a failover from the primary replica to the secondary replica, the cached plans compiled by the secondary replica are used to process matching query batches by the secondary replica. The secondary replica processes the matching query batches without accessing plans compiled by the primary replica.

20 Claims, 5 Drawing Sheets

(56) References Cited

U.S. PATENT DOCUMENTS

| | | | | |
|---|---|---|---|---|
| 10,292,528 | B2 * | 5/2019 | Perillon | A47J 36/025 |
| 10,949,413 | B2 * | 3/2021 | Sonawane | G06F 11/2035 |
| 11,847,110 | B2 * | 12/2023 | Sonawane | G06F 11/2028 |
| 12,204,558 | B2 * | 1/2025 | Colrain | G06F 16/2322 |
| 2009/0100114 | A1 | 4/2009 | Bestgen | |
| 2018/0260287 | A1 | 9/2018 | Iyer | |
| 2019/0102421 | A1 * | 4/2019 | Sonawane | G06F 11/2048 |
| 2024/0126785 | A1 * | 4/2024 | Colrain | G06F 11/2028 |
| 2024/0362222 | A1 * | 10/2024 | Cui | G06F 16/24539 |

OTHER PUBLICATIONS

Extended European Search Report Received for European Application No. 25217769.6, mailed on May 18, 2026, 12 Pages.

Laar De Van Enrico, "Replay your workload through the Query Store Replay script!", Retrieved from the Internet: URL: https://www.sqlservercentral.com/blogs/replay-your-workload-through-the-query-store-replay-script, Dec. 19, 2016. 06pages.

* cited by examiner

PLAN CACHE HYDRATION FOR DATABASE SYSTEMS

BACKGROUND

Query compilation is a process where a database system converts a high-level query into an efficient execution plan to retrieve data. Query optimization and compilation is a multi-phased process for generating a sufficient query execution plan. Query compilation is a compute-intensive process as searching for the optimal plan during compilation can consume significant system resources, such as central processing unit (CPU) time and memory. It is with respect to these and other considerations that the disclosure made herein is presented.

SUMMARY

Structured Query Language (SQL) systems typically implement a caching mechanism for processing query batches. The caching mechanism allows for the retaining of optimized plans from executed stored procedures, ad hoc queries, and the like. Cached plans can be re-used until they are deemed invalid (e.g., due to a schema/data change). The caching mechanism eliminates the cost of recompilation for frequently executed queries. When a failover occurs between a primary and backup compute instance in a computing network providing SQL services, the contents of the plan cache are deleted. During the first 5-10 minutes the plan cache is empty as the new instance while plans are compiled and cached. This burst of compilation processing causes the overall central processing unit (CPU) usage to spike, which can lead to overall resource contention and a drop in performance for client users. This phenomenon is referred to as "compile storm".

In various embodiments, in order to mitigate compile storms, a mechanism is implemented for replaying the query batches on the secondaries (the secondary instances) instead of copying over the plans from the primary to the secondary. In an embodiment, a persistent store approach is implemented, where batches are stored in a system table. In this approach, the captured data is transferred using inbuilt replication (e.g., SQL replication). Captured incoming batches are stored in this system table, utilizing replication to transfer the batches to the secondaries. The disclosed approach provides resiliency when restarts occur. A replay service is invoked that reads through the data in the system table and replays the batches in the secondaries. This hydrates the plan cache on the secondaries. In an embodiment, the replay service is a multithreaded application.

The disclosed technologies provide the technical benefits of mitigating compile storms during failovers in database systems, thus avoiding spikes in processing resources. This Summary is provided to introduce a selection of concepts in a simplified form that are further described below in the Detailed Description. This Summary is not intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, same reference numbers in different figures indicate similar or identical items.

DETAILED DESCRIPTION

Figure 1:
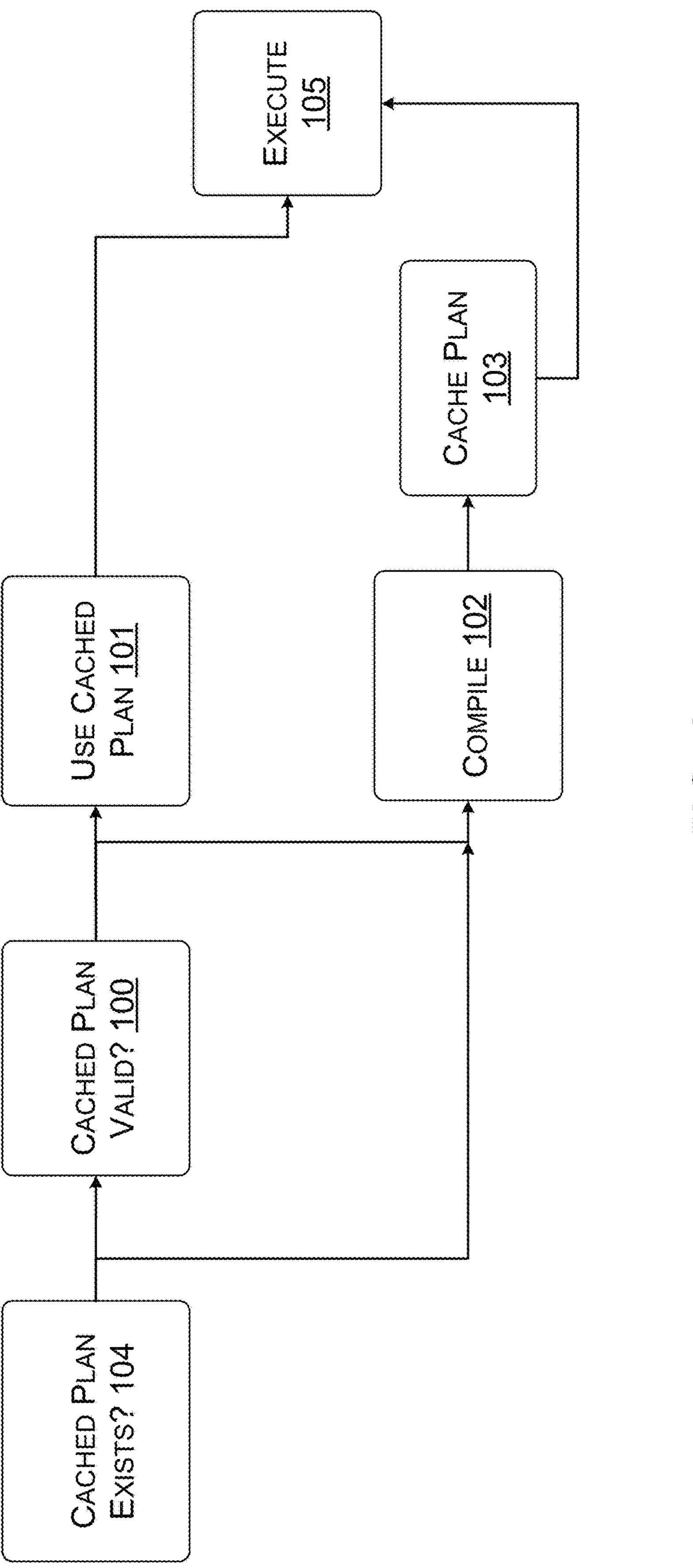
FIG. 1 illustrates an example architecture in accordance with the present disclosure.

Described herein are technologies that allow for improvements in the performance of multi-tenant architectures in SQL databases. Query optimization and compilation is a multi-phased process for generating query execution plans. Query compilation is an expensive process, searching for the optimal plan during compilation consumes significant CPU and memory resources. SQL systems typically implement a caching mechanism for processing query batches. However, such a mechanism is not implemented for ad hoc query batches. Identical ad hoc query batches are computed in parallel, causing parallel processing of plans since the cache plan is not used. This contributes to the problem of compile storms.

To address these and other issues, the present disclosure describes a mechanism that can be implemented for replaying the query batches on the secondaries (replicas of data and resources) instead of copying over the plans from the primary to the secondary.

One approach to address the above issues is to, during a planned failover, migrate the plan cache content to avoid due a slow down due to a recompilation storm. For example, the compiled plan object can be persisted on disk, and the original compiled plan can be recreated at the post-failover instance. This avoids the overuse of CPU resources on the secondary instances since the plans are copied over instead of being replayed. However, there are additional costs due to the amount of changes needed to the codebase. Furthermore, a mechanism is needed to handle invalid cache plans due to data/schema changes.

In an embodiment, the plan cache can be primed on the fly using, for example, a transport mechanism to transfer messages from the primary instance to the secondary instance. In another embodiment, a persistent store approach can be implemented where batches are stored in a new system table. In one implementation, the captured data can be transferred using inbuilt SQL replication. A new system table can be implemented and the captured incoming batches can be stored in this new system table, utilizing replication to transfer the batches to secondary instances. The persistent store approach provides resiliency against restarts. In some embodiments, requests on the secondary instance are executed from the system table originating from the primary and set to read-only access.

In an embodiment, the plan cache on the replicas is created as in the current primary instance in advance by recompiling the requests on the secondary instance. In an embodiment, the following steps are performed:

Capture user requests on the primary: batch and remote procedure call with parameters, store in persistent store.

Replay—For each secondary server, process each incoming captured data on its own thread and only execute up to the compile phase.

Periodically clean up the batches captured in the persistent store.

In an embodiment, a replay service is invoked that reads through the data in the system table and replays the batches in the secondaries. This hydrates the plan cache on the secondaries. In some embodiments, the replay service is pluggable such that it can be invoked from various hosts or agents.

In some embodiments, the replay service is a multi-threaded application. In one embodiment, the number of threads that can be spawned is controlled by a configuration value. The replay service can be bound by a resource group having a resource cap to limit resource usage. In some embodiments, a dedicated thread is spawned for each user database. Additionally, there may be multiple query plans associated with the same request. The replay service ensures that the replay code on the secondary generates the plan cache key lookup is the same code that is executed on the primary. The requests on the secondary instance will be executed from the replicated capture system table originating from the primary and will be set kept to read-only access.

In some embodiments, a fake execution mode is applied in which the query execution plan returns immediately before accessing the underlying tables, while maintaining the same compile to execution sequence. This reduces the cost of actual query execution while populating the secondary plan cache in the same way as the primary plan cache.

In an embodiment, each batch statement from the primary instance is captured along with relevant contextual information and sent to the secondary instance. In an embodiment, on the secondary instances, the batch or RPC requests can be run in a fake or simulated execution mode so that only compilation is performed and the same query plans as on the primary instance are reconstructed. In an embodiment, this is performed using a background connection to the instance.

Referring to FIG. 1, illustrated is an example of plan hydration in an embodiment. In the example, for a given query, it is determined if a cached plan exists 104. If a cached plan exists, it is determined if the cached plan is valid 100. If the cached plan is valid, then the cached plan is used 101. If the cached plan is not valid, or if the cached plan does not exist, then compilation 102 is performed. The compiled cache plan 103 is executed 105

Figure 2:
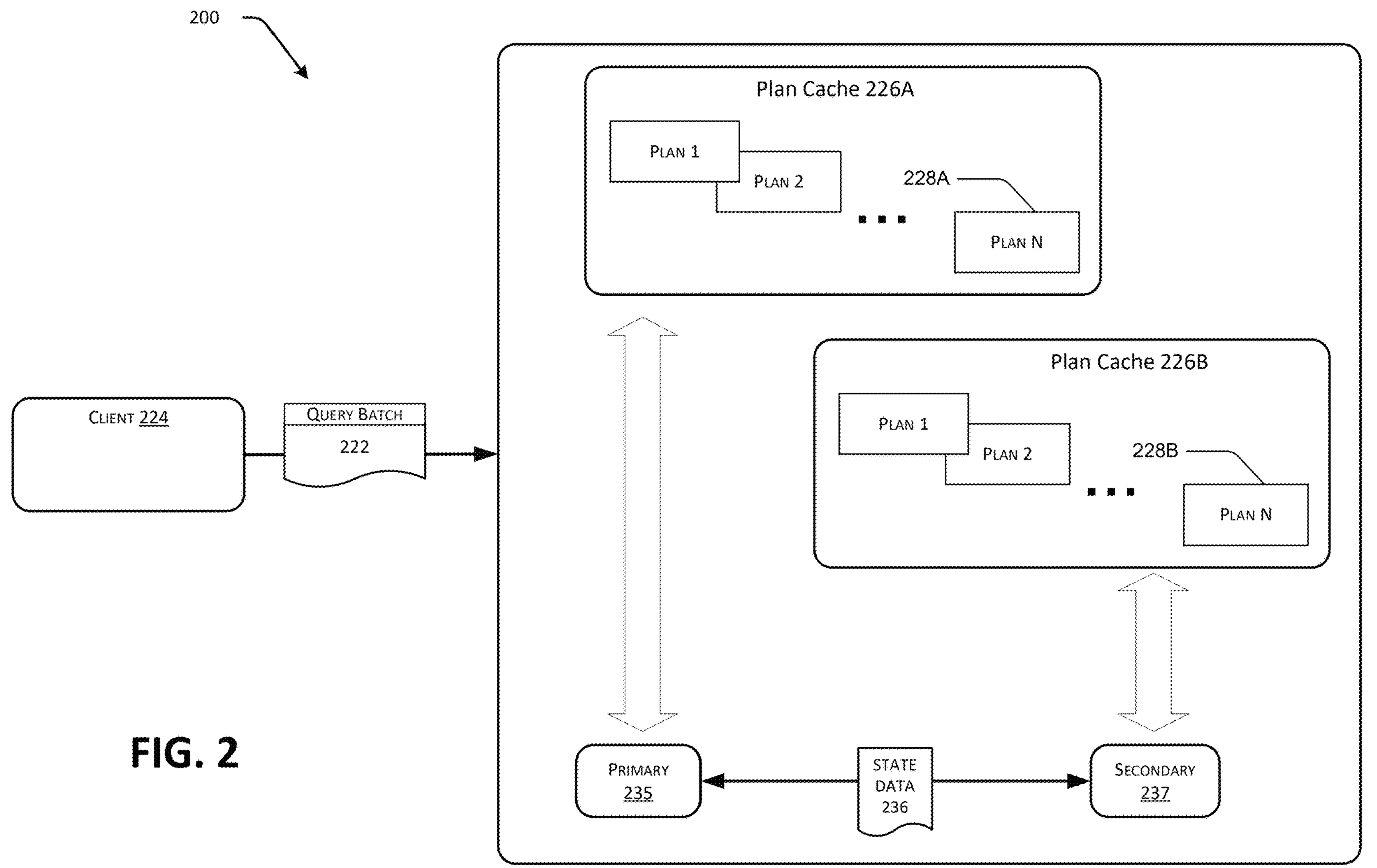
FIG. 2 illustrates an example architecture in accordance with the present disclosure.

FIG. 2 illustrates an example computing network 200 where high availability (HA) database services are provided in the computing network 200. In some HA database services, the database files and other data are provided in a primary replica that is accessible for read-write user workloads, and one or more secondary replicas which can include compute and storage containing copies of data. The primary replica can continuously synchronize or push changes to the secondary replicas and ensure that data is persisted on the secondary replicas before committing transactions. In the event of a failure or maintenance, a failover can be initiated to a synchronized replica. The replicas may also be referred to as instances, nodes, or other terms depending on the context.

Computing network 200 comprises a plurality of network devices including database services shown as DB services 234 implemented as at least two replicas (235, 237). The two replicas comprise an active replica 235 and a backup replica 237. The active replica 235 may also be referred to as a primary replica. The backup replica 237 may also be referred to as a standby or a secondary replica. A client or other user 224 may send a query 222 for accessing or modifying data in DB services 234, which are provided, in part, by active replica 235. In the event of maintenance or a failure event, the DB services 234 are switched to the backup replica 237. Backup replica 237 may need to update state data 236 in order to actively provide services. Computing network 200 comprises a plan cache 226A where various plans 228A are cached for implementing various query batches including query batch 222. Computing network 200 also comprises a plan cache 226B where various plans 228B are cached for implementing various query batches including query batch 222.

Figure 3:
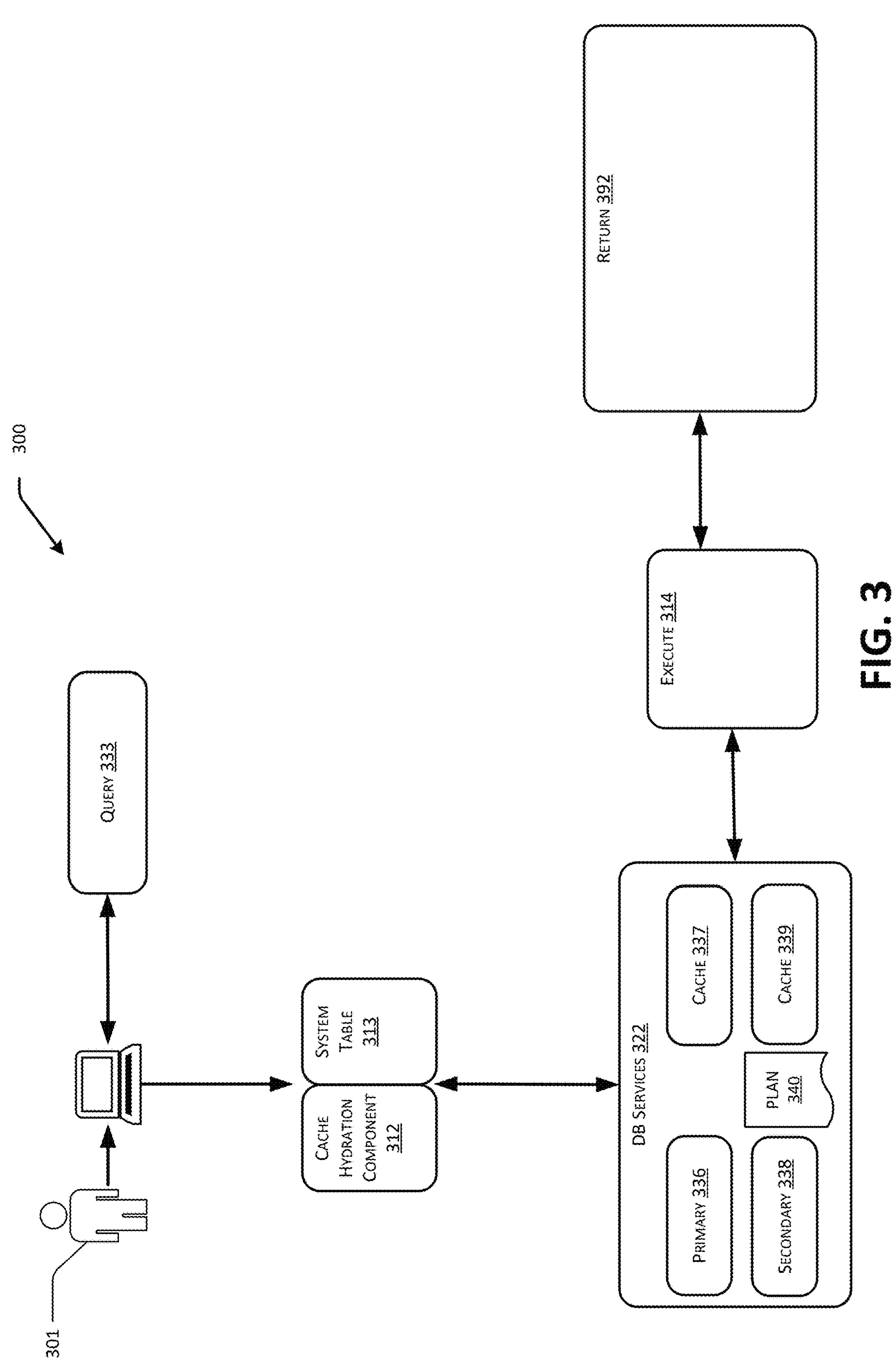
FIG. 3 illustrates an example architecture in accordance with the present disclosure.

FIG. 3 illustrates an example of performing query compilation in a computing network providing a database service in a computing network 300 providing a multi-tenant database service. A query 333 is captured from a tenant 301 of the computing network 300. A secondary compute replica 336 providing DB services 322 accesses query 333. In an embodiment, the query 333 is captured by cache hydration component 312. In an embodiment, the query 333 is stored in system table 313. The secondary compute instance 338 compiles captured query batches to generate plans 340 for the captured query batches. The secondary compute replica 338 caches the generated plans 340 in cache 339 for the secondary compute replica 338. In an embodiment, the plans are separately cached by each of the primary and secondary replicas. In an embodiment, the plans cached by the secondary replica are persisted. In response to a failover from the primary compute replica 336 to the secondary compute replica 338, cached plans compiled by the secondary compute replica 338 are used to process matching query batches by the secondary compute replica 338. The secondary compute replica 338 processes 314 the matching query batches without the need for plans in cache 337 compiled by the primary compute replica 336. Results of the query can be returned 392 to the tenant 301.

Figure 4:
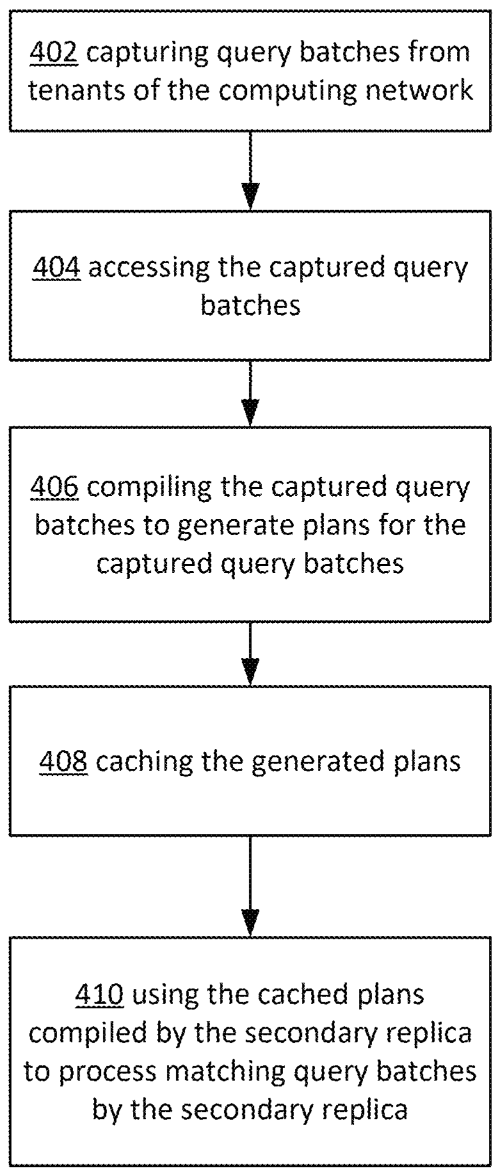
FIG. 4 illustrates an example procedure for performing query compilation in accordance with the present disclosure.

Turning now to FIG. 4, illustrated is an example operational procedure for performing query compilation in a computing network providing a database service and implementing a caching mechanism for processing database queries. In an embodiment, the database services are provided using a primary replica of data and computing resources, and a secondary replica of the data and computing resources. In an embodiment, the primary and secondary replicas are synchronized so that the secondary replica can provide the database services in place of the primary replica in response to a failover from the primary replica to the secondary replica.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Referring to FIG. 4, operation 402 illustrates capturing, by the database service, query batches from tenants of the computing network.

Operation 404 illustrates accessing, by the primary and secondary replicas, the captured query batches.

Operation 406 illustrates compiling, by the primary and secondary replicas, the captured query batches to generate plans for the captured query batches.

Operation 408 illustrates caching, by each of the primary and secondary replicas, the generated plans. In an embodiment, the plans are separately cached by each of the primary and secondary replicas. In an embodiment, the plans cached by the secondary replica are persisted.

Operation 410 illustrates in response to initiating, by the database service, a failover from the primary replica to the secondary replica, using the cached plans compiled by the secondary replica to process matching query batches by the secondary replica; wherein the secondary replica processes the matching query batches without accessing plans compiled by the primary replica.

Figure 5:
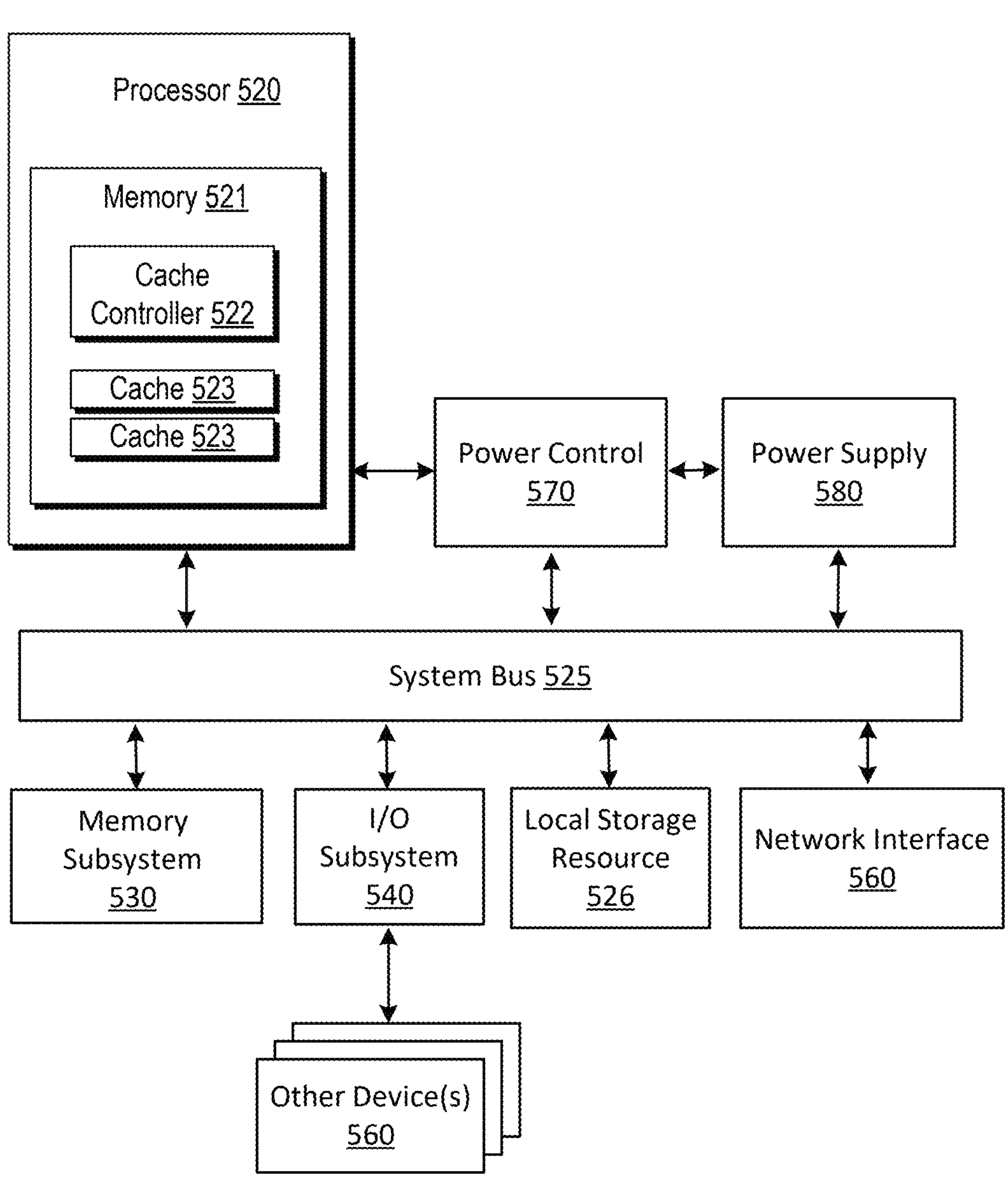
FIG. 5 illustrates an example architecture in accordance with the present disclosure.

FIG. 5 illustrates a block diagram depicting selected elements of an embodiment of a computing environment 500. As described herein, computing environment 500 may represent a computing device such as a personal computer system, a desktop computer, a server, etc. As shown in FIG. 5, components of computing environment 500 may include, but are not limited to, processor subsystem 520, which may comprise one or more processors, and system bus 525 that communicatively couples various system components to processor subsystem 520 including, for example, a memory subsystem 530, an I/O subsystem 540, local storage resource 526, and a network interface 560. System bus 525 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 5, network interface 560 may be a suitable system, apparatus, or device operable to serve as an interface between computing environment 500 and a network (not shown in FIG. 5). Network interface 560 may enable computing environment 500 to communicate over the network using a suitable transmission protocol and/or standard, including, but not limited to, transmission protocols and/or standards. In some embodiments, network interface 560 may be communicatively coupled via the network to a network storage resource (not shown). The network coupled to network interface 560 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network coupled to network interface 560 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network coupled to network interface 560 and/or various components associated therewith may be implemented using hardware, software, or any combination thereof.

As depicted in FIG. 5, processor subsystem 520 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 520 may interpret and/or execute program instructions and/or process data stored locally (e.g., in memory subsystem 530). In the same or alternative embodiments, processor subsystem 520 may interpret and/or execute program instructions and/or process data stored remotely (e.g., in a network storage resource, not shown).

As illustrated in FIG. 5, a memory subsystem 521 within processor subsystem 520 may include multiple data caches. A cache controller 522 within memory subsystem 521 may include circuitry to manage the contents of one or more caches 523. For example, cache controller 522 may include circuitry to determine when and if an individual cache line or a group of cache lines should be evicted from one of the caches in accordance with a policy. In at least some embodiments, cache controller 522 may also include circuitry to limit the amount of modified (dirty) cached data that would be flushed to persistent memory upon a system power failure or other power loss event, in response to requests and commands, or other events.

In FIG. 5, memory subsystem 530 may comprise a system, device, or apparatus operable to retain and/or retrieve program instructions and/or data for a period of time (e.g., computer-readable media). Memory subsystem 530 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 500, is powered down. Local storage resource 550 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Each of the processes, methods and algorithms described herein may be embodied in, and fully or partially automated by, code modules executed by one or more computers or computer processors as depicted in FIG. 5. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage. For purposes of the claims, the phrase "computer storage medium," "computer-readable storage medium," and variations thereof, does not include waves, signals, and/or other transitory and/or intangible communication media, per se.

In computing environment 500, I/O subsystem 540 may comprise a system, device, or apparatus generally operable to receive and/or transmit data to/from/within computing environment 500. I/O subsystem 540 may represent, for example, a variety of communication interfaces, graphics interfaces, video interfaces, user input interfaces, and/or peripheral interfaces. As shown, I/O subsystem 540 may further communicate with various I/O devices such as a touch panel and display adapter.

As illustrated in FIG. 5, computing environment 500 may include one or more power control modules 570 and one or more power supply units (PSUs) 580. In at least some embodiments, power control modules 570 may include power distribution circuitry. In at least some embodiments, power control module(s) 570 may control the allocation of power generated by one or more of the power supply units (PSUs) 580 to other resources in computing environment 500. In some embodiments, one or more of the power control modules 570 may include a management controller (MC).

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

The disclosure presented herein also encompasses the subject matter set forth in the following clauses:

Clause 1: A computer-implemented method for performing query compilation in a computing network providing a database service and implementing a caching mechanism for processing database queries, wherein the database services are provided using a primary replica of data and computing resources, and a secondary replica of the data and computing resources, wherein the primary and secondary replicas are synchronized so that the secondary replica can provide the database services in place of the primary replica in response to a failover from the primary replica to the secondary replica, the method comprising:

capturing, by the database service, query batches from tenants of the computing network;

accessing, by the primary and secondary replicas, the captured query batches;

compiling, by the primary and secondary replicas, the captured query batches to generate plans for the captured query batches;

caching, by each of the primary and secondary replicas, the generated plans, wherein the plans are separately cached by each of the primary and secondary replicas, and wherein the plans cached by the secondary replica are persisted; and in response to initiating, by the database service, a failover from the primary replica to the secondary replica, using the cached plans compiled by the secondary replica to process matching query batches by the secondary replica; wherein the secondary replica processes the matching query batches without accessing plans compiled by the primary replica.

Clause 2: The computer-implemented method of clause 1, wherein the database service is SQL.

Clause 3: The computer-implemented method of clauses 1 or 2, wherein the accessing and compiling is performed by a replay service.

Clause 4: The computer-implemented method of any of clauses 1 through 3, wherein the captured query batches are stored in a persistent store, wherein the stored query batches in the persistent store are accessible by the secondary replica.

Clause 5: The computer-implemented method of any of clauses 1 through 4, wherein the captured query batches are provided to the secondary replica by one of: transferring messages from the primary co replica to the secondary replica, or using replication.

Clause 6: The computer-implemented method of any of clauses 1 through 5, wherein the accessing and compiling are performed in response to determining that plans for the captured query batches were not found.

Clause 7: The computer-implemented method of any of clauses 1 through 6, further comprising accessing, by the secondary replica, the captured query batches along with contextual information.

Clause 8: A computing device comprising:

one or more processors;

a memory in communication with the one or more processors, the memory having computer-readable instructions stored thereupon which, when executed by the one or more processors, cause the computing device perform operations comprising:

capturing query batches from tenants of a computing network providing a database service and implementing a caching mechanism for processing database queries, wherein the database services are to users using a primary replica of data and computing resources, and a secondary replica of the data and computing resources, wherein the primary and secondary replicas are synchronized so that the secondary replica can provide the database services in place of the primary replica in response to a failover from the primary replica to the secondary replica;

accessing, by the secondary replica, the captured query batches;

compiling, by the secondary replica, the captured query batches to generate plans for the captured query batches;

caching, by the secondary replica, the generated plans, wherein the plans are separately cached separately from plans generated by the primary replica, and wherein the plans cached by the secondary replica are persisted; and in response to a failover from the primary replica to the secondary replica, using the cached plans compiled by the secondary replica to process matching query batches by the secondary replica; wherein the secondary replica processes the matching query batches without plans compiled by the primary replica.

Clause 9: The computing system of clause 8, wherein the database service is SQL.

Clause 10: The computing system of any of clauses 8 and 9, wherein the accessing and compiling is performed by a replay service running in the computing network.

Clause 11: The computing system of any clauses 8-10, wherein the captured query batches are stored in a persistent store, wherein the stored query batches in the persistent store are accessible by the secondary replica.

Clause 12: The computing system of any clauses 8-11, wherein the captured query batches are provided to the secondary replica by one of: transferring messages from the primary replica to the secondary replica, or using replication.

Clause 13: The computing system of any clauses 8-12, wherein the accessing and compiling are performed in response to determining that plans for the captured query batches were not found.

Clause 14: The computing system of any clauses 8-13, further comprising computer-readable instructions stored thereupon which, when executed by the one or more processors, cause the computing device perform operations comprising:

accessing, by the secondary replica, the captured query batches along with contextual information.

Clause 15: A computer-readable storage medium comprising computer-readable instructions stored thereupon which, when executed by one or more processors of a computing device, cause the computing device perform operations for performing query compilation in a computing network providing a database service, the operations comprising:

capturing query batches from tenants of a computing network providing a database service and implementing a caching mechanism for processing database queries, wherein the database services are to users using a primary instance of data and computing resources, and a secondary instance of the data and computing resources, wherein the primary and secondary instances are synchronized so that the secondary instance can provide the database services in place of the primary instance in response to a failover from the primary instance to the secondary instance;

accessing, by the secondary instance, the captured query batches;

compiling, by the secondary instance, the captured query batches to generate plans for the captured query batches;

caching, by the secondary instance, the generated plans, wherein the plans are separately cached separately from plans generated by the primary instance, and wherein the plans cached by the secondary instance are persisted; and in response to a failover from the primary instance to the secondary instance, using the cached plans compiled by the secondary instance to process matching query batches by the secondary instance; wherein the secondary instance processes the matching query batches without plans compiled by the primary instance.

Clause 16: The computer-readable storage medium of clause 15, wherein the database service is SQL.

Clause 17: The computer-readable storage medium of any of clauses 15 or 16, wherein the accessing and compiling is performed by a replay service running in the computing network.

Clause 18: The computer-readable storage medium of any of clauses 15-17, wherein the captured query batches are stored in a persistent store, wherein the stored query batches in the persistent store are accessible by the secondary instance.

Clause 19: The computer-readable storage medium of any of clauses 15-18, wherein the captured query batches are provided to the secondary compute instance by one of: transferring messages from the primary instance to the secondary instance, or using replication.

Clause 20: The computer-readable storage medium of any of clauses 15-19, wherein the accessing and compiling are performed in response to determining that plans for the captured query batches were not found.

What is claimed is:

1. A computer-implemented method for performing query compilation in a computing network providing a database service and implementing a caching mechanism for processing database queries, the method comprising:

capturing, by the database service, query batches from tenants of the computing network, wherein the database service is provided using a primary replica of data and computing resources and a secondary replica of the data and computing resources, wherein the primary and secondary replicas are synchronized so that the secondary replica can provide the database services in place of the primary replica in response to a failover from the primary replica to the secondary replica;

accessing, by the primary and secondary replicas, the captured query batches;

compiling, by the primary and secondary replicas, the captured query batches to generate plans for the captured query batches;

caching, by each of the primary and secondary replicas, the generated plans, wherein the plans are separately cached by each of the primary and secondary replicas, and wherein the plans cached by the secondary replica are persisted; and in response to initiating, by the database service, a failover from the primary replica to the secondary replica, using the cached plans compiled by the secondary replica to process matching query batches by the secondary replica; wherein the secondary replica processes the matching query batches without accessing plans compiled by the primary replica.

2. The computer-implemented method of claim 1, wherein the database service is SQL.

3. The computer-implemented method of claim 1, wherein the accessing and compiling is performed by a replay service.

4. The computer-implemented method of claim 1, wherein the captured query batches are stored in a persistent store, wherein the stored query batches in the persistent store are accessible by the secondary replica.

5. The computer-implemented method of claim 1, wherein the captured query batches are provided to the secondary replica by one of: transferring messages from the primary replica to the secondary replica, or using replication.

6. The computer-implemented method of claim 1, wherein the accessing and compiling are performed in response to determining that plans for the captured query batches were not found.

7. The computer-implemented method of claim 1, further comprising accessing, by the secondary replica, the captured query batches along with contextual information.

8. A computing device comprising:

one or more processors;

a memory in communication with the one or more processors, the memory having computer-readable instructions stored thereupon which, when executed by the one or more processors, cause the computing device perform operations comprising:

capturing query batches from tenants of a computing network providing a database service and implementing a caching mechanism for processing database queries, wherein the database services are provided using a primary replica of data and computing resources, and a secondary replica of the data and computing resources, wherein the primary and secondary replicas are synchronized so that the secondary replica can provide the database services in place of the primary replica in response to a failover from the primary replica to the secondary replica;

accessing, by the secondary replica, the captured query batches;

compiling, by the secondary replica, the captured query batches to generate plans for the captured query batches;

caching, by the secondary replica, the generated plans, wherein the plans are separately cached separately from plans generated by the primary replica, and wherein the plans cached by the secondary replica are persisted; and in response to a failover from the primary replica to the secondary replica, using the cached plans compiled by the secondary replica to process matching query batches by the secondary replica; wherein the secondary replica processes the matching query batches without plans compiled by the primary replica.

9. The computing device of claim 8, wherein the database service is SQL.

10. The computing device of claim 8, wherein the accessing and compiling is performed by a replay service running in the computing network.

11. The computing device of claim 8, wherein the captured query batches are stored in a persistent store, wherein the stored query batches in the persistent store are accessible by the secondary replica.

12. The computing device of claim 8, wherein the captured query batches are provided to the secondary replica by one of: transferring messages from the primary replica to the secondary replica, or using replication.

13. The computing device of claim 8, wherein the accessing and compiling are performed in response to determining that plans for the captured query batches were not found.

14. The computing device of claim 8, further comprising computer-readable instructions stored thereupon which, when executed by the one or more processors, cause the computing device perform operations comprising:

accessing, by the secondary replica, the captured query batches along with contextual information.

15. A computer-readable storage medium comprising computer-readable instructions stored thereupon which, when executed by one or more processors of a computing device, cause the computing device perform operations comprising:

capturing query batches from tenants of a computing network providing a database service and implementing a caching mechanism for processing database queries, wherein the database services are provided using a primary instance of data and computing resources, and a secondary instance of the data and computing resources, wherein the primary and secondary instances are synchronized so that the secondary instance can provide the database services in place of the primary instance in response to a failover from the primary instance to the secondary instance;

accessing, by the secondary instance, the captured query batches;

compiling, by the secondary instance, the captured query batches to generate plans for the captured query batches;

caching, by the secondary instance, the generated plans, wherein the plans are separately cached separately from plans generated by the primary instance, and wherein the plans cached by the secondary instance are persisted; and in response to a failover from the primary instance to the secondary instance, using the cached plans compiled by the secondary instance to process matching query batches by the secondary instance; wherein the secondary instance processes the matching query batches without plans compiled by the primary instance.

16. The computer-readable storage medium of claim 15, wherein the database service is SQL.

17. The computer-readable storage medium of claim 15, wherein the accessing and compiling is performed by a replay service running in the computing network.

18. The computer-readable storage medium of claim 15, wherein the captured query batches are stored in a persistent store, wherein the stored query batches in the persistent store are accessible by the secondary instance.

19. The computer-readable storage medium of claim 15, wherein the captured query batches are provided to the secondary instance by one of: transferring messages from the primary instance to the secondary instance, or using replication.

20. The computer-readable storage medium of claim 15, wherein the accessing and compiling are performed in response to determining that plans for the captured query batches were not found.

* * * * *